July 19, 1960 P. NOFI 2,945,642
STATIC LIFT WING PLANE
Filed Feb. 26, 1958
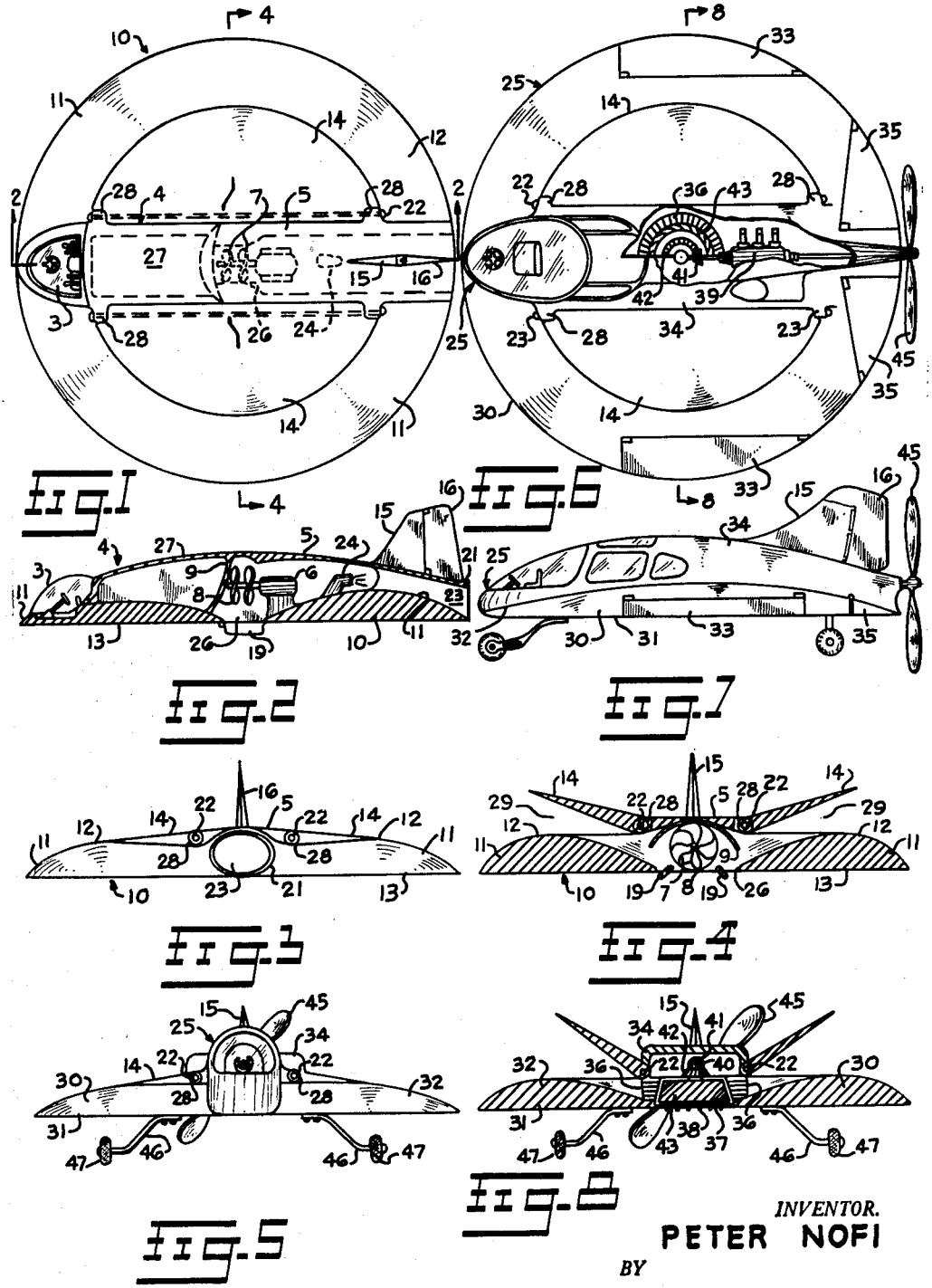
INVENTOR.
PETER NOFI
BY
Carl Miller
ATTORNEY

United States Patent Office 2,945,642
Patented July 19, 1960

2,945,642

STATIC LIFT WING PLANE

Peter Nofi, 66 Sunset Ave., Farmingdale, N.Y.

Filed Feb. 26, 1958, Ser. No. 717,699

5 Claims. (Cl. 244—12)

This invention relates to aeronautics and aircraft generally, and particularly to what I choose to term a static lift wing plane.

The main object of my invention is to provide a special type of aircraft having means for producing vertical lift thereof, combined with means for producing horizontal flight when desired altitude has been attained, without compromise losses in speed or power.

An ancillary object of my invention is to have such a type of aircraft equipped with means for producing a powerful movement of the air in contact with an airfoil portion thereof to result in a lifting force effective to lift the craft into the air at will.

Another object of the invention is to have the indicated type of aircraft which has a static wing of special form and a pair of alterable wings capable of being raised and lowered to change the airfoil structure of the static wing as a whole, as desired.

A further object of this invention is to provide the aircraft mentioned with the wings in such form that they fit smoothly into the general outline of the static wing so that both together have an effective airfoil section adapting it for horizontal flight and that the craft as a whole will virtually be saucer-shaped.

It is also an object of the invention to have the craft generally of the same overall construction, but adapted to assume two operational forms with respect to the means of propulsion for horizontal flight.

Another ancillary object is thus to have the craft in one form provided with jet propulsion means and in the other form with more or less conventional rear propeller means, both means producing the same ultimate effect.

It is an important object to have the aircraft referred to capable of rising into the air from a standstill position and then taking off horizontally toward a distant destination.

A practical object of the invention is likewise to have a craft of the nature disclosed which is simple and sturdy in construction, designed along sound aerodynamic principles and safe in flight.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a top plan view of a static lift wing plane made according to my invention and embodying the same in a practical form;

Figure 2 is a vertical longitudinal section of the same static lift wing plane as taken on line 2—2 in Figure 1;

Figure 3 is a rear elevation of the same aircraft as seen from the right in Figure 2;

Figure 4 is a vertical transverse section as taken on line 4—4 in Figure 1;

Figure 5 is a front elevation of a modification of the static lift wing plane of the previous views, but as seen from the left in Figure 7;

Figure 6 is a top plan view of the modified static lift wing plane of Figures 5 and 7;

Figure 7 is a side elevation of the same static lift wing plane of Figures 5 and 6; and Figure 8 is a vertical transverse section of the same as taken on line 8—8 in Figure 6.

Throughout the views, the same reference numerals indicate the same or like parts.

A well settled principle of aerodynamics is, of course that aircraft as a class depend on the airfoil section of their wings for the desired lifting effect when propelled horizontally through the air, but this does not apply to travel in any other direction. Moreover, conventional airplanes are limited to horizontal travel to effect such lift, although it would be highly desirable to rise into the air from a standstill position. Especially would it be desirable to be enabled to rise directly to a predetermined altitude and then proceed more or less horizontally through the intended path of travel toward a destination. While various proposals have heretofore been made to effect such results, nothing practical has as yet been adapted according to this definition or requirement.

Upon considering this problem, it has occurred to me that an aircraft that is to be capable of first rising vertically to flying altitude and thereafter proceeding along a horizontal path, should have a compound wing construction, that is, a static wing and a pair of complementary wings capable of being raised and lowered. The purpose thereof would be to present an airfoil section for normal flight when the wings are closed down, but when raised should allow air to be forced between the wings and the static wing to effect initial lift. As a result, I have succeeded in producing a static lift wing aircraft along the lines already outlined, which will now be set forth in detail in the following, due reference being had to the drawings referred to in the foregoing.

Hence, in the practice of my invention, a static lift plane body or fuselage 5 provided with an engine or motor 6 driving the propeller blades 7, 7 mounted upon a shaft 8 and operating in an air tunnel or cowling 9 opening downwards at 26, with the opening guided by depending flaps or louvers 19, 19. The engine may be of the jet type, but a special jet engine 24 may be located in the jet passage 23 directed rearwardly as an auxiliary driver means, if desired, the combustion gases being discharged rearwardly from jet tube 21. From the fuselage or body which as a whole is actually a ring-shaped member 10 having the upper curved airfoil surface 11 and substantially flat bottom 13, the curve on the upper surface arching down toward the entire periphery of the member 10 uniformly in all directions from the crest 12 and from the latter inwards downwardly toward opening 26 referred to, from the opposite sides having the wing hinges 28, 28, 28, etc. Through these hinges extend hinge rods 22, 22 upon which are mounted the two opposite and symmetrical side wings 14, 14 which at their outer edges come to rest upon the crest 12 of ring shaped static wing 10 when lowered thereon, as seen in Figure 3. When thus closed down, these wings 14 complement the outer curved portion or profile 11 of toroidal member 10 to form an airfoil effective for horizontal travel. However, at the outset, when the craft is intended to rise, the wings 14, 14 are raised into the position shown in Figure 4, when a space 29 is formed between these wings and airfoil member 10 allow air to be drawn in from over the outer periphery of member 10 just mentioned and down past the flaps 19, producing a lifting effect on the whole due to the airfoil profile of this member at 11 and 12, the engine 6 and propellers 7, 7 drawing in the air and forcing it down through opening 26, this air coming in from the sides beneath the wings 14.

Ordinarily, an airfoil is moved through the air to produce lifting thereof, but in this case, the airfoil 10 is stationary at first and the air is forced over the same, producing the same kind of lift vertically until the craft has risen to intended altitude, when the jet engine 24 and/or the engine 6 are set going to force air rearwardly through the jet tube 21 by way of passage 23. In the meantime, wings 14 are both lowered and closed down upon the crests 12 upon both sides of airfoil member, or rather annular static wing 10 and the flight of the craft will then proceed in horizontal direction. In order to direct the craft, the rudder 15 is fixed upon the rear portion with dirigible rudder member 16 hinged thereto. The cockpit 3 at the front may be of approved form, but its form and nature form no actual part of this invention as such. It is to be noted that for initial lift, the air is drawn in from the rear through tube 21 toward engine 6 and down past the flaps 19 and in addition from the sides beneath wings 14 when open, but in horizontal flight, the direction of the air through tube 21 is reversed to issue at the rear from jet engine 24 when wings 14 are closed down, flaps 19 also being closed at this time. Front cowling 4 is at all times closed behind cockpit 3.

In the modification shown in Figures 5 through 8, the same main principles of construction and operation still hold, the static wing member 30 being substantially the same as member 10, but provided with a cockpit 25, and having ailerons 33 and rear flaps 35 for finer control, while the outer airfoil profile 32 is similar to 11 of member 10 and the bottom 31 flat. The wings 14, 14 are as before hinged at 28, 28 to member 30 upon hinge rods 22, 22 at the sides of fuselage 34 and when closed down upon airfoil or static wing member 30 will form a complement thereto for horizontal flight as already described. When these wings are raised as in Figure 8, a space is formed between each wing and member 30 that communicate thru a plurality of horizontal guiding louvers 36 with a downward opening 37 in the central portion of static member 30 mentioned having the closable bottom louvers 38 adjusting opening 37.

Rearwardly of the central opening 37 is mounted an engine having a propeller shaft 40 with a bevel gear 41 fixed on the forward portion thereof and meshing with a corresponding gear 42 surmounting a vertical compressor 43 occupying opening 37, while upon the rear end of shaft 40 is fixed the rear air propeller 45. If desired, clutch means may be interposed between engine shaft 40 and compressor 43 and also propeller 45, so that either the compressor or propeller may be disengaged while the other is driven by the engine. The arrangement is such that when the craft is to rise, wings 14 are raised, engine 39 started to drive compressor 43 to force air to be drawn inwards over the airfoil section 32 of member 30 and down past louvers 36 and bottom louvers 38, causing a lift of the whole; when sufficient altitude has been attained, the engine is caused to drive the rear propeller 45. At the same time, the compressor 43 becomes idle, and wings 14, 14 are closed down so that the whole craft becomes adapted for horizontal flight which immediately ensues. When the destination has been reached, the propeller 45 is no longer operated, the wings 14 raised again and the engine caused to operate compressor 43 in order to allow measured descent of the craft toward the ground. For softening the landing, several resilient arms 46, 46 with tire wheels 47, 47, etc., are preferably attached to member 30 although forming no actual part of the invention but being conventional landing gear. Also, the stationary rudder 15 with the hinged rudder member 16 serve to direct the craft in flight.

In both forms of the invention, the ring-shaped static wing with the two side wings are used, with means for forcing air down through a central opening when the wings are raised, while at the rear is provided propulsion means for driving the craft horizontally forward when the wings are closed down. Cockpits may be used in both forms, as well as landing gear, being conventional, as well as ailerons and flaps, etc., such being well known control means.

One advantage of the jet engine form of craft is that the air intake can be disposed at the rear 23 so as to force the air to perform a double function or amount of work in the raised condition of wing 14, 14 as shown in Figure 4 by drawing the air inwardly over the side crests 12, 12 on static wing 10 center section and thereby creating extra lift.

The various control means of the manual wheel or lever types for effecting adjustments of the wing sections, rudder section, ailerons, flaps, closable louvers, etc., as well for starting and controlling the engine and the like are barely indicated but not described as being a matter of obvious choice from among many conventional means available to all skilled in the art.

Manifestly, variations may be resorted to, and parts and features may be modified or used without others within the scope of the appended claims.

Having now fully described my invention, I claim:

1. A static lift wing aircraft including a substantially ring-shaped static wing having an airfoil section upon its upper profile with a central opening with the crest thereof intermediate the outer periphery and the central opening, driven means for forcing air down through the opening, a pair of hinged opposite wings mounted upon the static wing with the wings opening outward in opposite side directions when raised to present openings between said wings and the static wing leading down into said central opening but forming complementary airfoil portions when closed down upon the crest portion of the static wing adapting the aircraft for horizontal flight, and means for driving said aircraft forward horizontally when the wings are closed down.

2. An aircraft according to claim 1, wherein the driven means include compressor means adjacent to the central opening mounted in effective position to draw air inwardly over the crest portion of the static wing at both sides and force said air down through said opening when the wings are raised.

3. An aircraft according to claim 2, wherein the means for driving the aircraft horizontally include a covered jet engine between the hinged wings having a rearwardly directed jet tube, a rudder being mounted upon the upper portion of the rear of said craft.

4. An aircraft according to claim 3, wherein the overall shape of the craft is substantially like that of an inverted circular convex saucer upon the upper portion thereof when the wings are closed down.

5. An aircraft according to claim 2, wherein the static wing has control means including flaps and closable louvers for the bottom of the central opening, and wherein the static wing has a series of stationary louvers leading inward from the space above the wing beneath the hinged wings toward the central opening.

References Cited in the file of this patent

UNITED STATES PATENTS

| | | |
|---|---|---|
| 1,959,270 | Hedlof | May 15, 1934 |
| 2,461,435 | Neumann et al. | Feb. 8, 1949 |
| 2,515,587 | Blondin | July 18, 1950 |
| 2,718,364 | Crabtree | Sept. 20, 1955 |
| 2,801,058 | Lent | July 30, 1957 |

FOREIGN PATENTS

| | | |
|---|---|---|
| 522,266 | Canada | Mar. 6, 1956 |